(12) United States Patent
Horio et al.

(10) Patent No.: US 8,422,133 B2
(45) Date of Patent: Apr. 16, 2013

(54) OPTICAL LAYERED BODY, POLARIZER, AND IMAGE DISPLAY DEVICE

(75) Inventors: Tomoyuki Horio, Tokyo (JP); Yoko Kinoshita, Tokyo (JP); Kiyoshi Itoh, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 478 days.

(21) Appl. No.: 12/303,041

(22) PCT Filed: Jun. 1, 2007

(86) PCT No.: PCT/JP2007/061195
§ 371 (c)(1),
(2), (4) Date: Feb. 9, 2009

(87) PCT Pub. No.: WO2007/142142
PCT Pub. Date: Dec. 13, 2007

(65) Prior Publication Data
US 2009/0207492 A1   Aug. 20, 2009

(30) Foreign Application Priority Data

Jun. 2, 2006 (JP) ................................ 2006-154725
Feb. 5, 2007 (JP) ................................ 2007-025779

(51) Int. Cl.
 *G02B 1/11* (2006.01)
(52) U.S. Cl.
 USPC ........................................................ 359/585
(58) Field of Classification Search .................. None
See application file for complete search history.

(56) References Cited

U.S. PATENT DOCUMENTS

| 7,784,954 B1 * | 8/2010 | Coleman ...................... 362/19 |
| 2003/0104188 A1 | 6/2003 | Shoshi et al. |
| 2006/0171034 A1 | 8/2006 | Shoshi et al. |

FOREIGN PATENT DOCUMENTS

| JP | 2003-139908 | 5/2003 |
| JP | 2003-307601 | 10/2003 |
| JP | 2003292831 A | 10/2003 |
| JP | 2004-094007 | 3/2004 |
| JP | 2004-174725 A | 6/2004 |
| JP | 2004-345228 | 12/2004 |
| JP | 2005-002220 A | 1/2005 |
| JP | 2005-008732 A | 1/2005 |
| JP | 2005-099778 A | 4/2005 |
| JP | 2005-208477 A | 8/2005 |
| JP | 2006-018233 | 1/2006 |
| JP | 2006-030881 A | 2/2006 |
| JP | 2006-72315 | 3/2006 |
| JP | 2006-123498 | 5/2006 |
| JP | 2006-126802 A | 5/2006 |
| JP | 2006-337790 | 12/2006 |
| WO | WO-2004-088364 | 10/2004 |
| WO | WO 2005063484 A1 * | 7/2005 |

* cited by examiner

*Primary Examiner* — Derek S Chapel
(74) *Attorney, Agent, or Firm* — Novak Druce Connolly Bove + Quigg LLP

(57) ABSTRACT

An optical layered body wherein the additive amount of the antistatic agent can be reduced leading to a cost reduction while achieving high antistatic property simply and at a low cost. An optical layered body including an optical layered body comprising a light-transmitting substrate and at least a hard coat layer and a low refractive index layer, firmed on the light-transmitting substrate, wherein 1) the low refractive index layer is formed on the outermost surface, and 2) the low refractive index layer contains an antistatic agent.

20 Claims, 3 Drawing Sheets

OPTICAL LAYERED BODY, POLARIZER, AND IMAGE DISPLAY DEVICE

CROSS REFERENCE TO RELATED APPLICATIONS

This application is a national phase of PCT/JP2007/061195, filed on Jun. 1, 2007, which claims priority to JP 2006-154725, filed on Jun. 2, 2006, and to JP 2007-025779, filed on Feb. 5, 2007, the entire contents of which are incorporated herein by reference in their entireties.

TECHNICAL FIELD

The present invention relates to an optical layered body, a polarizer, and an image display device.

BACKGROUND ART

In image display devices such as cathode ray tube (CRT) display devices, plasma displays (PDP), electroluminescence displays (ELD) and liquid crystal displays (LCD), plate-like transparent materials such as glass and plastic are used. These transparent materials have problems that transparency is apt to be impaired by such as adhesion of dust or stain due to static electricity or a scuff or a scratch.

Consequently, it is conducted that a hard coat layer has been formed on a transparent material, or another layer has been further formed on the hard coat layer for providing desired functions (for example, an antistatic property, an antifouling property, an antireflection property, etc.) (Patent Documents 1 to 3).

For example, in Patent Document 1, a method of providing an antistatic property by adding an antistatic agent to the hard coat layer is provided. In Patent Documents 2 and 3, a method of providing an antistatic property by forming an antistatic layer 1) between a substrate and the hard coat layer, or 2) between the hard coat layer and a low refractive index layer, or the like is provided.

However, in the method of Patent Document 1, a thickness of the hard coat layer generally needs to be larger than that of other layers to achieve such as predetermined strength and further, the antistatic agent has to be added in high density to exert antistatic performance, and therefore a large amount of an expensive antistatic agent is required and this method is economically disadvantageous.

On the other hand, in the methods of Patent Documents 2 and 3, it is necessary to have a step of forming one more layer in order to provide antistatic performance, and a process step tends to become troublesome. Further, since another layer is formed on the antistatic layer, antistatic performance becomes worse than that of the antistatic layer itself.

Accordingly, it is desired to provide an optical layered body having antistatic performance which can be obtained at low cost and by a simple method.

Patent Document 1: Japanese Kokai Publication 2004-345228
Patent Document 2: Japanese Kokai Publication 2004-94007
Patent Document 3: Japanese Kokai Publication 2006-18233

DISCLOSURE OF THE INVENTION

Problems to be Solved by the Invention

It is a principal object of the present invention to provide an optical layered body in which an additive amount of an antistatic agent causing high cost can be reduced, and a high antistatic property can be imparted simply and at a low cost.

Means for Solving the Problems

In view of the above state of the art, the present inventors made various investigations, and consequently they found that the above object is achieved by employing an optical layered body having a specific layer constitution. These findings have now led to completion of the present invention.

The present invention relates to an optical layered body comprising a light-transmitting substrate and at least a hard coat layer and a low refractive index layer, formed on the light-transmitting substrate, wherein 1) the low refractive index layer is formed on the outermost surface, and 2) the above low refractive index layer contains an antistatic agent.

In the above optical layered body, a content of the antistatic agent in the low refractive index layer is preferably 0.1 to 50% by weight.

The antistatic agent is preferably substantially clear and colorless.

The optical layered body preferably comprises an antiglare layer 1) between the hard coat layer and the light-transmitting substrate, or 2) between the hard coat layer and the low refractive index layer.

The optical layered body is preferably used as an antireflection layered body.

The present invention also relates to a selfluminous image display device comprising the optical layered body described above on the outermost surface.

The present invention also relates to a polarizer comprising a polarizing element, wherein the polarizer including the optical layered body described above on a surface of the above polarizing element.

The present invention also relates to a non-selfluminous image display device comprising the optical layered body described above or the polarizer described above on the outermost surface.

Hereinafter, the present invention will be described in detail.

By virtue of these characteristics, the optical layered body of the present invention becomes low in cost for an optical layered body combining an antistatic property with an antireflection property.

The optical layered body of the present invention can be suitably used as an antireflection layered body (including as a use of an antiglare layered body). Further, the optical layered body of the present invention is used for a transmissive display device. It is used particularly for displays such as televisions, computers, word processors and the like. Particularly, it is preferably used for the surfaces of displays such as CRTs, LCDs, PDPS, ELDs and FEDs.

The optical layered body of the present invention includes a light-transmitting substrate and at least a hard coat layer and a low refractive index layer, formed on the light-transmitting substrate, wherein
1) the low refractive index layer is formed on the outermost surface, and
2) the above low refractive index layer contains an antistatic agent. That is, since there is no need for forming another layer, the optical layered body can be obtained by a simple step. Further, since antistatic performance is imparted to the outermost surface, an adequately high antistatic property can be exerted.

Hereinafter, the substrates and the compositions used in the present invention will be described specifically. Here, in the present invention, curable resin precursors such as a monomer, an oligomer and a prepolymer are expressed by "resin", unless otherwise specified.

Light-Transmitting Substrate

As the light-transmitting substrate, a substrate having smoothness, heat resistance and excellent mechanical strength is preferable. Specific examples of materials for the light-transmitting substrate include thermoplastic resins such as polyester (polyethylene terephthalate, polyethylene naphthalate), cellulose triacetate, cellulose diacetate, cellulose acetate butylate, polyester, polyamide, polyimide, polyethersulfone, polysulfone, polypropylene, polymethylpentene, polyvinyl chloride, polyvinyl acetal, polyether ketone, polymethyl methacrylate, polycarbonate and polyurethane, and examples of preferable materials include polyester (polyethylene terephthalate, polyethylene naphthalate) and cellulose triacetate.

As the light-transmitting substrate, a substrate prepared by processing the thermoplastic resin into a film-like body which is rich in flexibility is preferably used, and plates of these thermoplastic resins may also be used or a plate-like body of glass plate may also be used in accordance with a mode of use required curability.

In addition, examples of the light-transmitting substrate include films of amorphous olefin polymer (cyclo-Olefin-Polymer: COP) having an alicyclic structure. This is a substrate in which such as norbornene polymers, monocyclic olefin polymers, cyclic conjugated diene polymers, or vinyl alicyclic hydrocarbon polymer resins are used, and examples of the amorphous olefin polymer include such as ZEONEX or ZEONOA (norbornene resin) produced by ZEON CORPORATION, SUMILITE FS-1700 produced by SUMITOMO BAKELITE Co., Ltd., ARTON (modified norbornene resin) produced by JSR CORPORATION, APEL (cyclic olefin copolymer) produced by Mitsui Chemicals, Inc., TOPAS (cyclic olefin copolymer) produced by Ticona Inc. and OPTOREZ OZ-1000 series (alicyclic acrylic resin) produced by Hitachi Chemical Co., Ltd.

Further, FV series (low birefringence and low photoelastic coefficient film) produced by Asahi Kasei Chemicals Corporation are also preferable as an alternative substrate of triacetyl cellulose.

The thickness of the light-transmitting substrate is preferably 20 µm or more and 300 µm or less, and more preferably has an upper limit of 200 µm and a lower limit of 30 µm. When the light-transmitting substrate is a plate-like body, the thickness may be 300 µm or more and 5000 µm or less beyond this thickness range. The substrate may be previously subjected to physical treatment such as corona discharge treatment and oxidation treatment, or may be coated with an anchor agent or a coating composition called as a primer at the time of forming the hard coat layer or antistatic layer in order to improve the adhesive property.

Hard Coat Layer

"The hard coat layer" in the present invention refers to a layer exhibiting the hardness of class "H" or higher in the pencil hardness test specified by JIS K 5600-5-4 (1999).

The thickness of the hard coat layer can be appropriately set depending on desired characteristics or the like, and the hard coat layer is desirably formed so as to have usually a thickness of 0.1 to 100 µm and particularly a thickness of 0.8 to 20 µm. This thickness is a value obtained by observing and measuring a cross section of the layer with an electron microscope (SEM, TEM, and STEM).

The hard coat layer is not particularly limited as long as it has transparency, but preferably, it is composed of a resin.

The resin is not particularly limited, and examples of the resin include three kinds of an ionizing radiation-curable resin which is a resin to be cured with ultraviolet light or electron beams, and a mixture of the ionizing radiation-curable resin and a solvent-drying resin (a resin which forms a coat by only drying a solvent added in order to adjust a solid content in applying the resin), and a thermosetting resin. Preferable examples of the resin include the ionizing radiation-curable resin. Further, in accordance with a preferable aspect of the present invention, a resin including at least the ionizing radiation-curable resin and the thermosetting resin can be used.

Examples of the above ionizing radiation-curable resin include polyfunctional (meth)acrylate.

Examples of bifunctional (meth)acrylate of the polyfunctional (meth)acrylate include such as tripropylene glycol di(meth)acrylate, polypropylene glycol di(meth)acrylate, diethylene glycol di(meth)acrylate, polyethylene glycol di(meth)acrylate, 1,3-butanediol di(meth)acrylate, 1,4-butanediol di(meth)acrylate, ethoxylated bisphenol A di(meth)acrylate, ethoxylated bisphenol F di(meth)acrylate, 1,6-hexanediol di(meth)acrylate, 1,9-nonanediol di(meth)acrylate, 1,10-decanediol di(meth)acrylate, glycerin di(meth)acrylate, neopentyl glycol di(meth)acrylate, propoxylated neopentyl glycol di(meth)acrylate, pentaerythritol diacrylate monostearate, ethoxy modified isocyanurate di(meth)acrylate (EO-modified isocyanurate di(meth)acrylate), bifunctional urethane acrylate, and bifunctional polyester acrylate. Examples of trifunctional (meth)acrylate include such as pentaerythritol tri(meth)acrylate, trimethylolpropane tri(meth)acrylate, EO-modified trimethylolpropane tri(meth)acrylate, EO-modified isocyanurate tri(meth)acrylate, ethoxylated trimethylolpropane tri(meth)acrylate, propoxylated trimethylolpropane tri(meth)acrylate, propoxylated glyceryl tri(meth)acrylate, and trifunctional polyester acrylate. Examples of tetrafunctional (meth)acrylate include such as pentaerythritol tetra(meth)acrylate, ditrimethylolpropane tetra(meth)acrylate, and ethoxylated pentaerythritol tetra(meth)acrylate. Examples of penta- or more functional (meth)acrylate include such as dipentaerythritol hydroxy penta(meth)acrylate and dipentaerythritol hexaacrylate.

Particularly, tri- or more functional (meth)acrylate is preferable from the viewpoint of preparing an optical layered body having high hardness. As the tri- or more functional (meth)acrylate, commercialized products can be used, and specific examples thereof include KAYARAD and KAYAMER series (for example, DPHA, PET-30, GPO-303, TMPTA, THE-330, TPA-330, D-310, D-330, PM-2, PM-21, DPCA-20, DPCA-30, DPCA-60, DPCA-120) produced by Nippon Kayaku Co., Ltd.; ARONIX series (for example, M-305, M-309, M-310, M-315, M-320, M-327, M-350, M-360, M-402, M-408, M-450, M-7100, M-7300K, M-8030, M-8060, M-8100, M-8530, M-8560, M-9050) produced by TOAGOSEI Co., Ltd.; NK ester series (for example, TMPT, A-TMPT, A-TMM-3, A-TMM3L, A-TMMT, A-TMPT-6EO, A-TMPT-3CL, A-GLY-3E, A-GLY-6E, A-GLY-9E, A-GLY-11E, A-GLY-18E, A-GLY-20E, A-9300, AD-TMP-4CL, AD-TMP) produced by Shin-Nakamura Chemical Co., Ltd.; NK ECONOMER series (for example, ADP-51, ADP-33, ADP-42, ADP-26, ADP-15) produced by Shin-Nakamura Chemical Co., Ltd.; NEW FRONTIER series (for example, TMP-T, TMP-3, TMP-15, TMP-2P, TMP-32, PET-3, TEICA) produced by Dai-Ichi Kogyo Seiyaku Co., Ltd.; Ebecryl series (for example, TMPTA, TMPTAN, 160, TMPEOTA, OTA480, 53, PETIA, 204-7, 40, 140, 1140, PETAK, DPHA) produced by Daicel-UCB Co., Ltd.; and CD501, CD9021, CD9052, SR351, SR351HP, SR351LV, SR368, SR368D, SR415, SR444, SR454, SR454HP, SR492, SR499, SR502, SR9008, SR9012, SR9020, SR9020HP, SR9035, CD9051, SR350, SR9009, SR9011, SR295, SR355, SR399, SR399LV, SR494, SR9041 produced by Sartomer Co., Inc.

Examples of the ionizing radiation-curable resin also include polyfunctional urethane(meth)acrylate.

As the polyfunctional urethane(meth)acrylate, bi- or more functional urethane(meth)acrylate, preferably tetra- or more functional urethane(meth)acrylate, can be used. As a compound having a urethane(meth)acrylate functional group, commercialized products can be used, and examples thereof include such as SHIKOH series (for example, UV-1700B, UV-6300B, UV-765B, UV-7640B and UV-7600B) produced by Nippon Synthetic Chemical Industry Co., Ltd.; Artresin series (for example, Artresin HDP, Artresin UN-9000H, Artresin UN-3320HA, Artresin UN-3320HB, Artresin UN-3320HC, Artresin UN-3320HS, Artresin UN-901M, Artresin UN-902MS and Artresin UN-903) produced by Negami Chemical Industrial Co., Ltd.; UA-100H, U-4H, U-4HA, U-6H, U-6HA, U-15HA, UA-32P, U-6LPA, U-324A and U-9HAMI produced by Shin-Nakamura Chemical Co., Ltd.; Ebecryl series (for example, 1290, 5129, 254, 264, 265, 1259, 1264, 4866, 9260, 8210, 204, 205, 6602, 220 and 4450) produced by Daicel-UCB Co., Ltd.; Beamset series (for example, 371 and 577) produced by Arakawa Chemical Industries, Ltd.; RQ series produced by MITSUBISHI RAYON Co., Ltd.; UNIDIC series produced by Dainippon Ink and Chemicals Inc.; DPHA-40H produced by Nippon Kayaku Co., Ltd.; and CN9006 and CN968 produced by Sartomer Co., Inc. Of these, UV-1700B (produced by Nippon Synthetic Chemical Industry Co., Ltd.), DPHA-40H (produced by Nippon Kayaku Co., Ltd.), Artresin HDP (produced by Negami Chemical Industrial Co., Ltd.), Beamset 371 (produced by Arakawa Chemical Industries, Ltd.), Beamset 577 (produced by Arakawa Chemical Industries, Ltd.), and U-15HA (produced by Shin-Nakamura Chemical Co., Ltd.) are preferable. As the ionizing radiation-curable resin, polyfunctional urethane acrylic acrylate can also be used, and examples of commercialized products include Hitaloid 7975 produced by Hitachi Chemical Co., Ltd.

Besides the compounds, a polyester resin, a polyether resin, an acrylic resin, an epoxy resin, a urethane resin, an alkyd resin, a spiroacetal resin, a polybutadiene resin, a polythiol-polyen resin and the like, which have an unsaturated double bond and a relatively low molecular weight, can also be used as the ionizing radiation-curable resin.

When the ionizing radiation-curable resin is used as an ultraviolet-curable resin, it is preferable to use a photopolymerization initiator. Specific examples of the photopolymerization initiator include acetophenones, benzophenones, Michler's benzoyl benzoate, thioxanthones, propiophenones, benzyls, benzoins, and acylphosphine oxides. Further, it is preferable to mix a photosensitizer to use, and specific example thereof include such as n-butylamine, triethylamine, and poly-n-butylphosphine.

As the photopolymerization initiator, in the case of resins having a radically polymerizable unsaturated group, acetophenones, benzophenones, thioxanthones, benzoin, benzoin methyl ether or the like is preferably used singly, or used as a mixture thereof. Further, as the photopolymerization initiator, in the case of resins having a cationically polymerizable functional group, for example, an aromatic diazonium salt, an aromatic sulfonium salt, an aromatic iodonium salt, a metallocene compound, benzoin sulfonate or the like is preferably used singly, or used as a mixture thereof.

Specific examples include such as Irgacure 184, Irgacure 907, Irgacure 369, Irgacure 379, Irgacure 819, Irgacure 127, Irgacure 500, Irgacure 754, Irgacure 250, Irgacure 1800, Irgacure 1870, Irgacure OXE01, DAROCUR TPO and DAROCUR 1173, produced by Ciba Specialty Chemicals K. K.; Speedcure MBB, Speedcure PBZ, Speedcure ITX, Speedcure CTX, Speedcure EDB, Esacure ONE, Esacure KIP150, and Esacure KTO46, produced by Nihon SiberHegner K. K.; and KAYACURE DETX-S, KAYACURE CTX, KAYACURE BMS and KAYACURE DMBI, produced by Nippon Kayaku Co., Ltd. An amount of the photopolymerization initiator to be added is preferably 0.1 to 10 parts by weight with respect to 100 parts by weight of the ionizing radiation-curable resin.

Examples of the solvent-drying resin, which is mixed in the ionizing radiation-curable resin to be used, include mainly thermoplastic resins. As the thermoplastic resins, resins generally exemplified are used. By adding the solvent-drying resin, coat defects of a coated surface can be effectively prevented. Specific examples of preferable thermoplastic resins include such as styrene resins, (meth)acrylic resins, vinyl acetate resins, vinyl ether resins, halogen-containing resins, alicyclic olefin resins, polycarbonate resins, polyester resins, polyamide resins, cellulose derivatives, silicone resins and rubbers or elastomers. As the thermoplastic resin, a resin, which is usually non-crystalline and soluble in organic solvents (particularly, a common solvent in which a plurality of polymers or curable compounds can be dissolved), is preferably used. Particularly, resins which are superior in a forming property or a film forming property, transparency and weather resistance, for example, styrene resins, (meth)acrylic resins, alicyclic olefin resins, polyester resins, and cellulose derivatives (cellulose esters, etc.) are preferable.

In a preferable aspect of the present invention, when a material of the light-transmitting substrate is a cellulose resin such as triacetyl cellulose "TAC", preferable specific examples of the thermoplastic resins include cellulose resins such as nitrocellulose, acetyl cellulose, cellulose acetate propionate, ethyl hydroxyethyl cellulose and the like.

Examples of the thermosetting resin, which can be used as the resin, include such as a phenolic resin, a urea resin, a diallylphthalate resin, a melanin resin, a guanamine resin, an unsaturated polyester resin, a polyurethane resin, an epoxy resin, an aminoalkyd resin, a melamine-urea copolycondensation resin, a silicon resin, and a polysiloxane resin. When the thermosetting resin is used, it can also be used in conjunction with a curing agent such as a crosslinking agent or a polymerization initiator, a polymerization accelerator, a solvent, a viscosity adjustment agent, or the like as required.

The hard coat layer can be obtained by using, as a composition for a hard coat layer, a solution or a dispersion obtained by dissolving or dispersing the above resin and an optional additive (for example, a polymerization initiator, an antistatic agent, an antiglare agent, an antifouling agent, a leveling agent, etc.) in a solvent, forming a coat from the above composition, and curing the coat.

The solvent may be a solvent which can be selected in accordance with the kinds and the solubility of the resin, and in which at least solid matter (a plurality of polymers and curable resin precursors, a polymerization initiator, other additives) can be dissolved uniformly. As such solvents, ketones (acetone, methyl ethyl ketone, methyl isobutyl ketone, cyclohexanone, etc.), ethers (dioxane, tetrahydrofuran, etc.), aliphatic hydrocarbons (hexane, etc.), alicyclic hydrocarbons (cyclohexane, etc.), aromatic hydrocarbons (toluene, xylene, etc.), halogenated hydrocarbons (dichloromethane, dichloroethane, etc.), esters (methyl acetate, ethyl acetate, butyl acetate, etc.), water, alcohols (ethanol, isopropanol, butanol, cyclohexanol, etc.), cellosolves (methyl cellosolve, ethyl cellosolve, etc.), cellosolve acetates, sulfoxides (dimethyl sulfoxide, etc.), and amides (dimethylformamide, dimethylacetamide, etc.) can be exemplified, and a mixed solvent thereof may also be used. Preferable solvents are methyl ethyl ketone, methyl acetate, ethyl acetate, butyl acetate, methyl isobutyl ketone, cyclohexanone, PGME and PGMEA.

As the solvent used for the above composition, particularly, a solvent having permeability into a light-transmitting substrate to be used (a solvent which can cause the substrate to be swelled or dissolved) can be suitably used. For example when a cellulose resin is used as the light-transmitting substrate, methyl ethyl ketone, methyl acetate, ethyl acetate, butyl acetate, cyclohexanone and the like can be suitably used.

When the solvent is used for the above composition, an amount of the solvent to be used may be appropriately set in such a way that the solid content of the composition is about 5 to 80% by weight.

A method for preparing the composition may be good as long as components can be mixed uniformly, and the composition may be prepared according to a known method. The components can be mixed by use of a known apparatus such as a paint shaker, a beads mill, a kneader and a mixer.

As a method of forming a coat, known methods may be employed. For example, various methods such as a spin coating method, a dip coating method, a spray coating method, a die coating method, a bar coating method, a roller coating method, a meniscus coating method, a flexography method, a screen printing method, and a bead coating method can be used.

A method of curing a coat obtained may be appropriately selected in accordance with the content or the like of the composition. For example, if the composition is ultraviolet-curable, the composition may be cured by irradiating ultraviolet light onto the coat.

As the composition for a hard coat layer, a compound which becomes a raw material of the above resin having transparency may be used, and the composition can be appropriately set in accordance with the kinds of the above resin.

The hard coat layer may contain a high refractive index resin. A refractive index of the high refractive index resin is preferably 1.55 or more, and particularly preferably 1.60 or more. The content of the high refractive index resin contained in the hard coat layer is preferably 0.1% or more and 99% or less, and particularly preferably 1% or more and 90% or less. When a refractive index of the hard coat layer is increased, generally, a high refractive index material may be added to the material for forming a hard coat layer. As the high refractive index material, metal oxide (e.g., $TiO_2$, $ZrO_2$) fine particles having a particle size of several nanometers to 100 nm can be used in a state of being dispersed, or other high refractive index organic resin materials such as a fluorene resin, a sulfuric resin, a bromic resin or a carbazole resin can be appropriately added and used.

The composition for a hard coat layer may contain an additive such as a polymerization initiator or an antiglare agent as required.

Examples of the above polymerization initiator include the initiators described above.

As the antiglare agent, for example, a wide variety of fine particles can be used. A shape thereof may be any of spheric, elliptic or the like, and a spheric particle is preferable. Further, examples of the fine particles include inorganic particles and organic particles. The fine particle exhibits an antiglare property and is preferably transparent. Specific examples of the fine particles include a silica bead for inorganic particles and a plastic bead for organic particles. Specific examples of the plastic bead include such as a styrene bead (refractive index 1.60), a melamine bead (refractive index 1.57), an acrylic bead (refractive index 1.49 to 1.53), an acrylic-styrene bead (refractive index 1.54), a benzoguanamine-formaldehyde condensate bead (refractive index 1.68), a melamine-formaldehyde condensate bead (refractive index 1.68), a polycarbonate bead and a polyethylene bead, and these beads can be used singly or in combination of two or more kinds.

In this case, an anti-settling agent is preferably used in combination. The reason for this is that addition of the anti-settling agent can keep the resin bead from precipitating to disperse the resin bead uniformly in a solvent. Specific examples of the anti-settling agent include silica bead having a particle size of 0.5 μm or less, preferably about 0.1 to 0.25 μm.

Low Refractive Index Layer

The low refractive index layer in the optical layered body of the present invention is formed on the outermost surface, and contains an antistatic agent.

The low refractive index layer is a layer to play a role of decreasing a reflection factor of light when external light (for example, fluorescent lamp, natural light, etc.) is reflected on the surface of the optical layered body. Since the low refractive index layer in the present invention has the characteristics, it is superior in an antistatic property in addition to the antireflection property. Particularly, since antistatic performance is imparted to the outermost layer, the antistatic performance of the surface is efficiently exerted and dust hardly adheres. In other words, a small additive amount of the antistatic agent can prevent the adhesion of dust.

The low refractive index layer preferably has a refractive index of 1.45 or less, particularly 1.42 or less.

An antistatic agent contained in the low refractive index layer is not particularly limited as long as it has electrically conductive performance. Examples of the antistatic agent include a quaternary ammonium salt, a pyridinium salt, an imidazolium salt, and various cationic compounds having a cationic group such as a primary, a secondary and a tertiary amino group; anionic compounds having an anionic group such as a sulfonate group, a sulfate group, a phosphate group and a phosphonate group; ampholytic compounds such as an amino acid compound, an aminosulfate compound, a boron compound and a phosphorus compound; nonionic compounds such as an amino alcohol compound, a glycerin compound and a polyethylene glycol compound; organic metal compounds such as alkoxide of tin and alkoxide of titanium and metal chelate compounds such as an acetylacetonate salt thereof. The compound may be an ionizing radiation-curable resin having an acrylate functional group in a molecule. Furthermore, compounds formed by polymerizing the compounds described above can be included. Further, polymerizable compounds such as monomer or oligomer which has a tertiary amino group, a quaternary ammonium group or a metal chelate portion and is polymerizable with ionizing radiation, and organic metal compounds like a coupling agent having a functional group which can be polymerized with ionizing radiation can also be used as an antistatic agent. These compounds can be used singly or in combination of two or more kinds, and can also be used in conjunction with the following electrically conductive ultrafine particle.

In the present invention, as the antistatic agent, electrically conductive ultrafine particles can also be used. Specific examples of the electrically conductive ultrafine particles include substances composed of metal oxides. Examples of such metal oxides include ZnO (refractive index 1.90 or less, a value in a parenthesis represents a refractive index), $CeO_2$ (1.95), $Sb_2O_2$ (1.71), $SnO_2$ (1.997), indium tin oxide (abbreviation; ITO, 1.95), $In_2O_3$ (2.00), $Al_2O_3$ (1.63), antimony-doped tin oxide (abbreviation; ATO, 2.0), aluminum-doped zinc oxide (abbreviation; AZO, 2.0) and the like. As for a particle diameter of the ultrafine particle, a particle of 1 micron or smaller, that is sub micron, is preferable, and particularly, the ultrafine particle having an average particle diameter of 0.1 nm to 0.1 μm is preferable. Here, the above average particle diameter is a value measured by a dynamic light-scattering method.

Examples of other antistatic agents include carbon materials such as a carbon nanotube, a carbon nanohorn and fullerene. The above carbon nanotube is a monolayer or multilayer tubular carbon polyhedron having a structure in which a graphite sheet having a carbon six-membered ring structure as a main structure is closed in the form of cylinder. The above carbon nanohorn has a conical shape in which the tip of the carbon nanotube is closed.

Furthermore, for example, electron conductive polymers, and ionically conductive antistatic agents such as a lithium salt, organic boron compounds and the like can be exemplified.

Examples of the electron conductive polymers include at least one selected from the group consisting of aliphatic conjugated polyacetylene, polyacene and polyazulene, aromatic conjugated polyphenylene, heterocyclic conjugated polypyrrole, polythiophene and polyisothianaphthene, heteroatom-containing conjugated polyaniline and polythienylenevinylene, mixed type conjugated poly(phenylenevinylene), a double chain conjugated system which is a conjugated system having a plurality of conjugate chains in a molecule, derivatives of these electrically conductive polymers, and electrically conductive complexes which are polymers prepared by grafting these conjugate polymer chains to a saturated polymer or block-copolymerizing these conjugate polymer chains with a saturated polymer. Among them, it is more preferable to use organic antistatic agents such as polythiophene, polyaniline and polypyrrole. By using the above organic antistatic agent, it becomes possible that excellent antistatic performance is exerted and simultaneously a total light transmittance of the optical layered body is enhanced and a haze value is reduced. Further, an anion of organic sulfonic acid, iron chloride or the like may also be added as a dopant (electron-donating agent) for the purpose of improving electric conductivity or antistatic performance. In consideration of an effect of addition of dopant, particularly, polythiophene is preferable since its transparency and antistatic property are high. As the above polythiophene, oligothiophene can also be suitably used. The derivatives are not particularly limited, and examples thereof include such as alkyl group substitutes of polyphenylacetylene and polydiacetylene.

Preferable examples of the lithium salt as the ionically conductive antistatic agent include lithium perfluoroalkylsulfonate, lithium bis(perfluoroalkyl)sulfoneimide, or lithium perchlorate. More specifically, preferable examples of lithium perfluoroalkylsulfonate include such as lithium trifluoromethylsulfonate, and lithium pentafluoroethylsulfonate, and examples of lithium bis(perfluoroalkyl)sulfoneimide include such as lithium bis(trifluoromethane)sulfoneimide or lithium bis(pentafluoroethane)sulfoneimide. Among them, lithium bis(trifluoromethane)sulfoneimide or lithium bis(pentafluoroethane)sulfoneimide is preferably used since it is particularly superior in environmental reliability.

As the organic boron compound, an ionically bonded material of polyether, polyaldehide or polyketone and boron is particularly preferred.

The antistatic agent is preferably substantially clear and colorless. A haze value of the low refractive index layer can be reduced by using such antistatic agents.

A content of the antistatic agent in the low refractive index layer may be appropriately determined depending on the kinds of the antistatic agent, and the content is usually about 0.1 to 50% by weight, preferably about 0.5 to 30% by weight, and more preferably about 1 to 20% by weight.

By having this range, antistatic performance can be exerted more effectively and abrasion resistance becomes high, and further a haze value can be reduced.

The low refractive index layer of the present invention is preferably formed from besides the above antistatic agent and resin such as a thermoplastic resin, a thermosetting resin, or an ionizing radiation-curable resin or an ionizing radiation-curable compound (including organic reactive silicon compounds or fluorine atom-containing compounds (described later as fluororesin)). Among them, the thermosetting resin, or the ionizing radiation-curable resin or the ionizing radiation-curable compound is preferable. Particularly, it is most preferable to use the ionizing radiation-curable resin and/or the ionizing radiation-curable compound.

The ionizing radiation-curable compound can be used as an ionizing radiation-curable composition including the ionizing radiation-curable compound. As the ionizing radiation-curable compound, at least one of a monomer, an oligomer and a prepolymer, which has a polymerizable unsaturated bond or an epoxy group in a molecule, can be used. Here, an ionizing radiation refers to one having energy quantum capable of polymerizing or crosslinking a molecule, of an electromagnetic wave and a charged particle beam, and ultraviolet light or an electron beam is usually used.

Examples of the prepolymer or the oligomer in the ionizing radiation-curable composition include such as unsaturated polyesters such as a condensate of unsaturated dicarboxylic acid and polyhydric alcohol; methacrylates such as polyester methacrylate, polyether methacrylate, polyol methacrylate and melamine methacrylate; acrylates such as polyester acrylate, epoxy acrylate, urethane acrylate, polyether acrylate, polyol acrylate and melamine acrylate; and cationic polymerizable epoxy compounds. These can be used singly or in combination of two or more kinds.

Examples of the monomer in the ionizing radiation-curable composition include at least one of styrene monomers such as styrene, and α-methylstyrene; acrylates such as methyl acrylate, 2-ethylhexyl acrylate, methoxyethyl acrylate, butoxyethyl acrylate, butyl acrylate, methoxybutyl acrylate, and phenyl acrylate; methacrylates such as methyl methacrylate, ethyl methacrylate, propyl methacrylate, methoxyethyl methacrylate, ethoxymethyl methacrylate, phenyl methacrylate and lauryl methacrylate; unsaturated-substituted substituted aminoalcohol esters such as 2-(N,N-diethylamino)ethyl acrylate, 2-(N,N-dimethylamino)ethyl acrylate, 2-(N,N-dibenzylamino)methyl acrylate and 2-(N,N-diethylamino)propyl acrylate; unsaturated carboxylic amides such as acrylamide and methacrylamide; diacrylate compounds such as ethylene glycol diacrylate, propylene glycol diacrylate, neopentyl glycol diacrylate, 1,6-hexanediol diacrylate and triethylene glycol diacrylate; polyfunctional compounds such as dipropylene glycol diacrylate, ethylene glycol diacrylate, propylene glycol dimethacrylate and diethylene glycol dimethacrylate; and/or polythiol compounds having two or more thiol groups in a molecule (for example, trimethylolpropane trithioglycolate, trimethylolpropane trithiopropylate, pentaerythritol tetrathioglycolate, etc.)

Examples of the ionizing radiation-curable resin include polyfunctional (meth)acrylate.

Examples of bifunctional (meth)acrylate of the polyfunctional (meth)acrylate include such as tripropylene glycol di(meth)acrylate, polypropylene glycol di(meth)acrylate, diethylene glycol di(meth)acrylate, polyethylene glycol di(meth)acrylate, 1,3-butanediol di(meth)acrylate, 1,4-butanediol di(meth)acrylate, ethoxylated bisphenol. A di(meth) acrylate, ethoxylated bisphenol F di(meth)acrylate, 1,6-hexanediol di(meth)acrylate, 1,9-nonanediol di(meth)acrylate, 1,10-decanediol di(meth)acrylate, glycerin di(meth)acrylate, neopentyl glycol di(meth)acrylate, propoxylated neopentyl glycol di(meth)acrylate, pentaerythritol diacrylate monostearate, ethoxy modified isocyanurate di(meth)acrylate (EO-modified isocyanurate di(meth)acrylate), bifunctional urethane acrylate, and bifunctional polyester acrylate. Examples of trifunctional (meth)acrylate include such as pentaerythritol tri(meth)acrylate, trimethylolpropane tri(meth) acrylate, EO-modified trimethylolpropane tri(meth)acrylate, EO-modified isocyanurate tri(meth)acrylate, ethoxylated trimethylolpropane tri(meth)acrylate, propoxylated trimethylolpropane tri(meth)acrylate, propoxylated glyceryl tri(meth) acrylate, and trifunctional polyester acrylate. Examples of tetrafunctional (meth)acrylate include such as pentaerythritol tetra(meth)acrylate, ditrimethylolpropane tetra(meth)acrylate, and ethoxylated pentaerythritol tetra(meth)acrylate. Examples of pentafunctional or more (meth)acrylate include such as dipentaerythritol hydroxy penta(meth)acrylate and dipentaerythritol hexaacrylate.

Particularly, tri- or more functional (meth)acrylate is preferable from the viewpoint of preparing an optical layered body having high hardness. As the tri- or more functional (meth)acrylate, commercialized products can be used, and specific examples thereof include KAYARAD and KAYAMER series (for example, DPHA, PET-30, GPO-303, TMPTA, THE-330, TPA-330, D-310, D-330, PM-2, PM-21, DPCA-20, DPCA-30, DPCA-60, DPCA-120) produced by Nippon Kayaku Co., Ltd.; ARONIX series (for example, M-305, M-309, M-310, M-315, M-320, M-327, M-350, M-360, M-402, M-408, M-450, M-7100, M-7300K, M-8030, M-8060, M-8100, M-8530, M-8560, M-9050) produced by TOAGOSEI Co., Ltd.; NK ester series (for example, TMPT, A-TMPT, A-TMM-3, A-TMM3L, A-TMMT, A-TMPT-6EO, A-TMPT-3CL, A-GLY-3E, A-GLY-6E, A-GLY-9E, A-GLY-11E, A-GLY-18E, A-GLY-20E, A-9300, AD-TMP-4CL, AD-TMP) produced by Shin-Nakamura Chemical Co., Ltd.; NK ECONOMER series (for example, ADP-51, ADP-33, ADP-42, ADP-26, ADP-15) produced by Shin-Nakamura Chemical Co., Ltd.; NEW FRONTIER series (for example, TMP-T, TMP-3, TMP-15, TMP-2P, TMP-3P, PET-3, TEICA) produced by Dai-Ichi Kogyo Seiyaku Co., Ltd.; Ebecryl series (for example, TMPTA, TMPTAN, 160, TMPEOTA, OTA480, 53, PETIA, 2047, 40, 140, 1140, PETAK, DPHA) produced by Daicel-UCB Co., Ltd.; and CD501, CD9021, CD9052, SR351, SR351HP, SR351LV, SR368, SR368D, SR415, SR444, SR454, SR454HP, SR492, SR499, SR502, SR9008, SR9012, SR9020, SR9020HP, SR9035, CD9051, SR350, SR9009, SR9011, SR295, SR355, SR399, SR399LV, SR494, SR9041 produced by Sartomer Co., Inc.

Examples of the ionizing radiation-curable resin also include polyfunctional urethane(meth)acrylate.

As the urethane(meth)acrylate, bi- or more functional urethane(meth)acrylate, preferably tetra- or more functional urethane(meth)acrylate, can be used. As a compound having a urethane(meth)acrylate functional group, commercialized products can be used, and examples thereof include such as SHIKOH series (for example, UV-1700B, UV-6300B, UV-765B, UV-7640B and UV-7600B) produced by Nippon Synthetic Chemical Industry Co., Ltd.; Artresin series (for example, Artresin HDP, Artresin UN-9000H, Artresin UN-3320HA, Artresin UN-3320HB, Artresin UN-3320HC, Artresin UN-3320HS, Artresin UN-901M, Artresin UN-902MS and Artresin UN-903) produced by Negami Chemical Industrial Co., Ltd.; UA-100H, U-4H, U-4HA, U-6H, U-6HA, U-15HA, UA-32P, U-6LPA, U-324A and U-9HAMI produced by Shin-Nakamura Chemical Co., Ltd.; Ebecryl series (for example, 1290, 5129, 254, 264, 265, 1259, 1264, 4866, 9260, 8210, 204, 205, 6602, 220 and 4450) produced by Daicel-UCB Co., Ltd.; Beamset series (for example, 371 and 577) produced by Arakawa Chemical Industries, Ltd.; RQ series produced by MITSUBISHI RAYON Co., Ltd.; UNIDIC series produced by Dainippon Ink and Chemicals Inc.; DPHA-40H produced by Nippon Kayaku Co., Ltd.; and CN9006 and CN968 produced by Sartomer Co., Inc. Of these, UV-1700B (produced by Nippon Synthetic Chemical Industry Co., Ltd.), DPHA-40H (produced by Nippon Kayaku Co., Ltd.), Artresin HDP (produced by Negami Chemical Industrial Co., Ltd.), Beamset 371 (produced by Arakawa Chemical Industries, Ltd.), Beamset 577 (produced by Arakawa Chemical Industries, Ltd.), and U-15HA (produced by Shin-Nakamura Chemical Co., Ltd.) are preferable. As the ionizing radiation-curable resin, polyfunctional urethane acrylic acrylate can also be used, and examples of commercialized products include Hitaloid 7975 produced by Hitachi Chemical Co., Ltd.

As the monomer in the ionizing radiation-curable composition, one or two or more of the above compounds are usually mixed to be used as required, and it is preferable that the content of the prepolymer or the oligomer of the monomer is set to be 5% by weight or more and the content of the monomer and/or the polythiol compound is set to be 95% by weight or less in order to impart a normal applying suitability to the ionizing radiation-curable composition.

When flexibility is required to the low refractive index layer, it is desirable to reduce an amount of the monomer or to use an acrylate monomer having one or two functional groups. Further, when wear resistance, heat resistance, solvent resistance and the like are required to the low refractive index layer, it is preferable to use, for example, an acrylate monomer having three or more functional groups. Here, examples of the acrylate monomers having one functional group include such as 2-hydroxyacrylate, 2-hexylacrylate, and phenoxyethylacrylate. Examples of the acrylate monomers having two functional groups include ethylene glycol diacrylate, and 1,6-hexanediol diacrylate. Examples of the acrylate monomers having three or more functional groups include such as trimethylolpropane triacrylate, pentaerythritol triacrylate, pentaerythritol tetraacrylate, and dipentaerythritol hexaacrylate.

It is also possible to add a resin, which is not cured by irradiation of ionizing radiation, to the ionizing radiation-curable composition as required to adjust physical properties such as flexibility and surface hardness of the low refractive index layer. Examples of the resin include one or two or more of thermoplastic resins such as a polyurethane resin, a cellulose resin, a polyvinylbutylal resin, a polyester resin, an acrylic resin, a polyvinyl chloride resin and a polyvinyl acetate resin. Among them, at least one of the polyurethane resin, the cellulose resin, the polyvinylbutylal resin and the like is preferable in point of improving flexibility. When the ionizing radiation-curable composition is cured by irradiation of ultraviolet light, a photopolymerization initiator or a photopolymerization accelerator may be added. As the photopolymerization initiator, in the case of resins having a radically polymerizable unsaturated group, for example, acetophenones, benzophenones, thioxanthones, benzoin, benzoin methyl ether or the like can be used singly, or can be used in combination of two or more kinds thereof. Further, as the photopolymerization initiator, in the case of resins having a cationically polymerizable functional group, for example, an aromatic diazonium salt, an aromatic sulfonium salt, an aromatic iodonium salt, a metallocene compound, benzoin sulfonate or the like can be used singly, or in combination of two or more kinds.

Specific examples include such as Irgacure 184, Irgacure 907, Irgacure 369, Irgacure 379, Irgacure 819, Irgacure 127, Irgacure 500, Irgacure 754, Irgacure 250, Irgacure 1800, Irgacure 1870, Irgacure OXE01, DAROCUR TPO and DAROCUR 1173, produced by Ciba Specialty Chemicals K. K.; Speedcure MBB, Speedcure PBZ, Speedcure ITX, Speedcure CTX, Speedcure EDB, Esacure ONE, Esacure KIP150, and Esacure KTO46, produced by Nihon SiberHegner K. K.; and KAYACURE DETX-S, KAYACURE CTX, KAYACURE BMS and KAYACURE DMBI, produced by Nippon Kayaku Co., Ltd. Among them, Irgacure 369, Irgacure 127, Irgacure 907, Esacure ONE, Speedcure MBB, Speedcure PBZ, and KAYACURE DETX-S are preferable.

An amount of the photopolymerization initiator to be added may be appropriately set depending on the kinds of the photopolymerization initiator to be used, and may be about 0.1 to 10 parts by weight with respect to 100 parts by weight of the ionizing radiation-curable resin.

A reactive organic silicon compound may be used in conjunction with the ionizing radiation-curable composition as required. For example, a compound expressed by the formula $RmSi(OR')n$ (wherein R and R' are the same or different from each other and represent an alkyl group having 1 to 10 carbon atoms, and m and n represent an integer satisfying a relationship of $m+n=4$, respectively.) can be used. Specific examples thereof include at least one of tetramethoxy silane, tetraethoxy silane, tetra-iso-propoxy silane, tetra-n-propoxy silane, tetra-n-butoxy silane, tetra-sec-butoxy silane, tetra-tert-butoxy silane, tetrapentaethoxy silane, tetrapenta-iso-propoxy silane, tetrapenta-n-propoxy silane, tetrapenta-n-butoxy silane, tetrapenta-sec-butoxy silane, tetrapenta-tert-butoxy silane, methyltriethoxy silane, methyltripropoxy silane, methyltributoxy silane, dimethyldimethoxy silane, dimethyldiethoxy silane, dimethylethoxy silane, dimethylmethoxy silane, dimethylpropoxy silane, dimethylbutoxy silane, methyldimethoxy silane, methyldiethoxy silane, hexyltrimethoxy silane and the like.

In this case, a silane coupling agent may be used in combination as required. Specific examples of the silane coupling agent include at least one of γ-(2-aminoethyl)aminopropyltrimethoxy silane, γ-(2-aminoethyl)aminopropylmethyldimethoxy silane, β-(3,4-epoxycyclohexyl)ethyltrimethoxy silane, γ-aminopropyltriethoxy silane, γ-methacrloxypropylmethoxy silane, N-β-(N-vinylbenzylaminoethyl)-γ-aminopropylmethoxy silane-hydrochloride, γ-glycidoxypropyltrimethoxy silane, amino silane, methylmethoxy silane, vinyltriacetoxy silane, γ-mercaptopropyltrimethoxy silane, γ-chloropropyltrimethoxy silane, hexamethyldisilazane, vinyltris(β-methoxyethoxy) silane, octadecyldimethyl[3-(trimethoxysilyl)propyl]ammonium chloride, methyltrichloro silane, dimethyldichloro silane and the like.

Further, the low refractive index layer may be composed of any of 1) a resin containing silica or magnesium fluoride, 2) fluororesin being a low refractive index resin, 3) fluororesin containing silica or magnesium fluoride, and 4) a thin film of silica or magnesium fluoride. The same resins as those composing the composition for a hard coat layer can be used for resins other than the fluororesin.

As the fluororesin, a polymerizable compound containing fluorine atoms at least in a molecule or a polymer thereof can be used. The polymerizable compound is not particularly limited, for example, a polymerizable compound having a curable and reactive group such as an ionizing radiation-curable group or a heat-curable polar group is preferable. Further, compounds having these reactive groups simultaneously may also be used. In contrast to this polymerizable compound, the polymer is a polymer having no reactive group at all as described above.

As polymerizable compounds having an ionizing radiation-curable group, fluorine-containing monomers having an ethylenic unsaturated bond can be widely employed. More specifically, fluoroolefins (for example, fluoroethylene, vinylidene fluoride, tetrafluoroethylene, hexafluoropropylene, perfluorobutadiene, perfluoro-2,2-dimethyl-1,3-dioxole, etc.) can be exemplified. Examples of polymerizable compounds having a (meth)acryloyloxy group include fluorine-containing (meth)acrylate compounds such as 2,2,2-trifluoroethyl(meth)acrylate, 2,2,3,3,3-pentafluoropropyl (meth)acrylate, 2-(perfluorobutyl)ethyl(meth)acrylate, 2-(perfluorohexyl)ethyl(meth)acrylate, 2-(perfluorooctyl) ethyl(meth)acrylate, 2-(perfluorodecyl)ethyl(meth)acrylate, α-trifluoromethylmethacrylate and α-trifluoroethylmethacrylate; and fluorine-containing polyfunctional (meth) acrylic acid ester compounds having a fluoroalkyl group, a fluorocycloalkyl group or a fluoroalkylene group, having 1 to 14 carbon atoms, which have at least three fluorine atoms, and at least two (meth)acryloyloxy groups in a molecule.

Preferable examples of the heat-curable polar group include groups to form a hydrogen bond such as a hydroxyl group, a carboxyl group, an amino group and an epoxy group. These groups are superior in not only the adhesion to a coat but also the affinity for an inorganic ultra fine particle such as silica. Examples of the polymerizable compounds having a heat-curable polar group include 4-fluoroethylene-perfluoroalkylvinylether copolymer; fluoroethylene-hydrocarbonvinylether copolymer; and fluorine modified products of various resins such as epoxy, polyurethane, cellulose, phenol and polyimide.

Examples of the polymerizable compounds having the ionizing radiation-curable group and the heat-curable polar group together include partially and fully fluorinated alkyl, alkenyl or aryl esters of acrylic acid or methacrylic acid, fully or partially fluorinated vinyl ethers, fully or partially fluorinated vinyl esters, and fully or partially fluorinated vinyl ketones.

Further, examples of the fluororesins include the following compounds. Polymers of a monomer or a mixture of monomers, containing at least one fluorine-containing (meth)acrylate compound of the polymerizable compounds having the ionizing radiation-curable group; copolymers of at least one of the fluorine-containing (meth)acrylate compound described above and a (meth)acrylate compound not containing a fluorine atom in a molecule like methyl(meth)acrylate, ethyl(meth)acrylate, propyl(meth)acrylate, butyl(meth)acrylate and 2-ethylhexyl(meth)acrylate; and monopolymers or copolymers of fluorine-containing monomers such as fluoroethylene, vinylidene fluoride, trifluoroethylene, chloro-trifluoroethylene, 3,3,3-trifluoropropylene, 1,1,2-trichloro-3,3, 3-trifluoropropylene and hexafluoropropylene. Silicone-containing vinylidene fluoride copolymers formed by including a silicone component in above copolymers can also be used.

The silicone component is not particularly limited, and examples thereof include (poly)dimethylsiloxane, (poly)diethylsiloxane, (poly)diphenylsiloxane, (poly)methylphenylsiloxane, alkyl modified (poly)dimethylsiloxane, azo group-containing (poly)dimethylsiloxane, dimethylsilicone, phenylmethylsilicone, alkyl-aralkyl modified silicone, fluorosilicone, polyether modified silicone, aliphatic acid ester modified silicone, methyl hydrogen silicone, silanol group-containing silicone, alkoxy group-containing silicone, phenol group-containing silicone, methacryl modified silicone, amino modified silicone, carboxylic acid modified silicone, carbinol modified silicone, epoxy modified silicone, mercapto modified silicone, fluorine modified silicone, and polyether modified silicone. Among them, silicone components having a dimethylsiloxane structure are preferable.

More specific examples of the dimethylsiloxane structure include those formed by adding various crosslinking agents, for example, tetrafunctional silanes such as tetraacetoxy silane, tetraalkoxy silane, tetra(ethyl methyl ketoxime)silane and tetraisopropenylsilane, and further trifunctional silanes such as alkyl- or alkenyl triacetoxy silane, triketoximesilane, triisopropenyl silane and trialkoxy silane, to polyalkyl-, polyalkenyl-, or polyarylsiloxane such as polydimethylsiloxane, polymethylphenylsiloxane, or polymethylvinylsiloxane, having a silanol group at the end, and mixing the resulting mixtures, or those which have reacted in advance in some cases.

Furthermore, non-polymers or polymers composed of the following compounds can also be used as a fluororesin. That is, compounds obtained by reacting a fluorine-containing compound having at least one isocyanate group in a molecule with a compound having at least one functional group, such as an amino group, a hydroxyl group or a carboxyl group, which reacts with an isocyanate group in a molecule; compounds obtained by reacting fluorine-containing polyols such as fluorine-containing polyether polyols, fluorine-containing alkyl polyols, fluorine-containing polyester polyols and fluorine-containing $\in$-caprolactone modified polyols with a compound having an isocyanate group; and the like can be used.

Further, each resin component described in the composition for a hard coat layer can be mixed to be used together with the polymerizable compounds or polymers having fluorine atoms. Furthermore, a curing agent for curing the reactive group or the like, and various additives and solvents for improving a coating property or imparting an antifouling property can be appropriately used.

In the present invention, it is preferable to contain "fine particle having voids in its inside" in addition to the antistatic agent. By containing the fine particle, the refractive index of the low refractive index layer can be reduced while maintaining layer strength of the low refractive index layer. In the present invention, the term "fine particle having voids in its inside" means a fine particle being a hollow structure in which the inside of the fine particle is filled with vapor and/or a porous structure in which vapor is contained in the inside of the fine particle, and having a lower refractive index as compared with a particle not having voids. The refractive index of the fine particle having voids is generally deceased as an increase of the vapor making up of the fine particle.

Examples of inorganic fine particles of the above fine particles include silica fine particles disclosed in Japanese Kokai. Publication 2001-233611. In addition, silica particles prepared by production methods described in Japanese Kokai Publication Hei-7-133105, Japanese Kokai Publication 2002-79616, and Japanese Kokai Publication 2006-106714, may be used. Since the silica particle having voids is easily produced and has high hardness of its own, the layer strength is improved and it becomes possible to adjust easily the refractive index in a range of about 1.20 to 1.45 when the particles are mixed with the binder to form the low refractive index layer. On the other hand, examples of organic fine particles include a hollow polymer fine particle disclosed in Japanese Kokai Publication 2002-80503.

In the present invention, the fine particle, in which a nano porous structure can be formed at least a part of inside and/or the surface of the coat, is also included in the above fine particle. Examples of the fine particle, in which the nano porous structure can be formed at least a part of inside and/or the surface of the coat, include 1) a slow-release agent in which various chemical substances are adsorbed on a column for filling and a porous portion on the surface, 2) porous particles used for fixing a catalyst, or 3) hollow particles intended for incorporation into a heat insulating material or a low dielectric material. Specific examples thereof include such as "Nipsil" (trade name) produced by Nihon Silica K.K. and "colloidal silica UP series" (trade name) produced by Nissan Chemical Industries Co., Ltd.

An average particle diameter of the "fine particle having voids in its inside" is 5 nm or more and 300 nm or less, and preferably, a lower limit is 8 nm or more and an upper limit is 100 nm or less, and more preferably, the lower limit is 10 nm or more and the upper limit is 80 nm or less. It becomes possible to impart excellent transparency to the low refractive index layer by having the average particle diameter of the fine particle of this range. Here, the above average particle diameter is a value measured by a dynamic light-scattering method.

In the case of containing "fine particle having voids in its inside", the amount thereof may be usually about 0.1 to 500 parts by weight, and preferably about 10 to 200 parts by weight with respect to 100 parts by weight of the resin.

In forming the low refractive index layer, it can be formed from, for example, a composition (composition for a refractive index layer) containing a raw material component. More specifically, a solution or a dispersion formed by dissolving and dispersing the raw material component (e.g., the above antistatic agent, resin, etc.) and the optional additives (e.g., the above "particles having voids", a polymerization initiator, an antiglare agent, etc.) in a solvent is used as a composition for a low refractive index layer, and a coat by the above composition is formed, and the above coat is cured, thereby obtaining a low refractive index layer. Here, examples of the additives such as the polymerization initiator, the antiglare agent, etc. include, for example, additives described in the hard coat layer.

Particularly, in the present invention, the above antistatic agent is mixed together with components composing the low refractive index layer. Accordingly, there is no need for the step of producing and forming an antistatic layer separately in order to impart antistatic performance. Therefore, the optical layered body of the present invention can be produced by a simpler step. Further, since the low refractive index layer is formed on the outermost surface of the optical layered body, the antistatic performance is easily exerted. Further, since the thickness of the low refractive index layer is small as compared with this case where the antistatic agent is mixed in the hard coat layer, the antistatic performance can be exerted in a smaller amount.

Examples of the solvent also include solvents described in the description of the hard coat layer, and preferable solvents are such as methyl isobutyl ketone, IPA, n-butanol, t-butanol, diethyl ketone, and PGME.

A method for preparing the above composition for a low refractive index layer may be good as long as components can be mixed uniformly, and the composition may be prepared according to a known method. For example, the components can be mixed by use of a known apparatus described in the formation of the hard coat layer.

As a method of forming a coat, known methods may be employed. For example, various methods described in the formation of the hard coat layer can be used.

A method of curing a coat obtained may be appropriately selected in accordance with the content or the like of the composition. For example, when the composition is ultraviolet-curable, the composition may be cured by irradiating ultraviolet light onto the coat.

Other Layers

A basic layer constitution of the present invention may be a constitution in which at least a hard coat layer and a low refractive index layer are formed on a light-transmitting substrate and the low refractive index layer is formed on the outermost surface. For example, a three-layer structure in which the hard coat layer is formed adjacently on the light-transmitting substrate and the low refractive index layer is formed adjacently on the hard coat layer can be included. In this case, one or two or more of other layers (a high refractive index layer, an antiglare layer, an adhesive layer, another hard coat layer, etc.) can be appropriately formed 1) between the hard coat layer and the low refractive index layer, or 2) under the hard coat layer to a extent not impairing a light-transmitting property or the like of the optical layered body of the present invention as required. Those which are same as known antireflection layered body can also be employed for these layers.

Antiglare Layer

The antiglare layer may be formed, for example, between the hard coat layer and the light-transmitting substrate or the low refractive index layer. The antiglare layer may be formed from a resin composition containing a resin and an antiglare agent.

The resin can be appropriately selected from the resins described in the hard coat layer to be used.

As the antiglare agent, a wide variety of fine particles can be used. An average particle diameter of the fine particle is not limited, and it may be generally about 0.01 to 20 µm. A shape of the fine particle may be any of spheric, elliptic or the like, and a spheric particle is preferable. Further, examples of the fine particles include inorganic particles and organic particles. Here, the above average particle diameter is a value measured by a dynamic light-scattering method.

The fine particle exhibits an antiglare property and is preferably transparent. Specific examples of the fine particles include fine particles exemplified in the hard coat layer.

The above fine particle is preferably a fine particle to satisfy all of the following equations:

$30 \leq Sm \leq 600$, $0.05 \leq Rz \leq 1.60$, $0.1 \leq \theta a \leq 2.5$, and $0.3 \leq R \leq 20$, if denoting an average particle diameter of the fine particle by R (rpm), ten-point mean roughness of the surface roughness of the antiglare layer by Rz (µm), an mean spacing of the surface roughness of the antiglare layer by Sm (µm), and a mean angle of inclination of the surface roughness by βa.

Sm (µm) represents an mean spacing of the surface roughness of the antiglare layer, θa (°) represents a mean angle of inclination of the surface roughness, and Rz represents ten-point mean roughness of the surface roughness, and the definitions are in accordance with JIS B 0601-1994 and are described in an instruction manual (revised on Jul. 20, 1995) of a surface roughness measuring instrument (model: SE-3400, manufactured by Kosaka Laboratory Ltd.)

θa is a unit of angle, and when an inclination is expressed by a ratio (Δa) of a height to a base, $\Delta a = \tan \theta a = $ (sum total of difference (corresponding a height of each projection) between a maximum and a minimum in each projection and depression/reference length), and θa can be determined by the above equation. The reference length is a cut off value λc of a roughness curve in a measuring instrument SE-3400 and corresponds an evaluation length actually measured by a stylus. Measuring conditions of the surface roughness measuring instrument is in accordance with JIS B 0601 1994.

In accordance with another preferable aspect of the present invention, an antiglare layer, in which when refractive indexes of the above fine particle and the above resin composition are denoted by n1 and n2, respectively, n1 and n2 satisfy the relationship of $\Delta n = |n1 - n2| < 0.15$ and a haze value (determine by subtracting a haze value of the outside due to projections and depressions from a haze value of the whole optical layered body) of the inside of the antiglare layer is 55% or less, is preferable.

An additive amount of the fine particles depends on kinds of the fine particle to be used and a desired antiglare property, and it may be usually 2 to 30 parts by weight, and preferably 10 to 25 parts by weight with respect to 100 parts by weight of the resin composition.

The anti-settling agent may be added in preparing the composition for an antiglare layer. The addition of the anti-settling agent can keep the resin bead from precipitating to disperse the resin bead uniformly in a solvent. As specific examples of the anti-setting agents, beads such as a silica bead can be used. Average particle diameter of the bead is not particularly limited, but it is generally 0.5 µm or less, and preferably 0.1 to 0.25 µm. Here, the above average particle diameter is a value measured by a dynamic light-scattering method.

Preferably, a film thickness (after being cured) of the antiglare layer is generally in a range of about 0.1 to 100 µm, and particularly in a range of 0.8 to 10 µm. By having a film thickness of this range, a function as an antiglare layer can be fully exerted.

The film thickness of the antiglare layer can be measured by the following method.

A cross section of the optical layered body is observed in a transmission mode with a confocal laser scanning microscope (Leica TCS-NT: manufactured by Ernst Leitz Optische Werke: a magnification of 300 to 1000 times) to determine the presence or absence of the interface, and a film thickness can be measured according to the following measuring criteria. Specifically, a wet objective lens was applied to the confocal laser scanning microscope and about 2 ml of oil with a refractive index of 1.518 was placed on the optical layered body to be observed and determined in order to obtain clear images without halation. The oil is used to eliminate an air layer between the objective lens and the optical layered body.

Procedure of Measurement

1: An average layer thickness was measured through the observation of a laser scanning microscope.

2: Measuring conditions were as described above.

3: A layer thickness of highest projection and a layer thickness of lowest depression in the projections and depressions per one image screen are measured to obtain 2 measured values, and this measurement was repeated for 5 image screens to yield 10 measured values. An average is determined from 10 measured values, and the average value is assumed to be a layer thickness. This laser scanning microscope can perform a nondestructive cross section observation by virtue of the differences in refractive indexes of each of the layers. Further, by observing cross section photographs of SEM and TEM which can be observed through the differences in composition of each of the layers on 5 image screens, an average layer thickness can be determined similarly.

High Refractive Index Layer

The high refractive index layer may be formed, for example, between the hard coat layer and the low refractive index layer. By imparting a higher refractive index than that of the hard coat layer, effective antireflection performance can be attained.

The high refractive index layer may be formed from a resin composition containing a resin and a refractive index-enhancing agent. The resin and the refractive index-enhancing agent can be appropriately selected from those described in the hard coat layer to be used.

A film thickness of this layer can be changed in accordance with the purpose within a range of 60 nm to 10 μm. The film thickness is a value obtained by observing and measuring a cross section of the layer with an electron microscope (SEM, TEM, and STEM).

The optical layered body of the present invention can be suitably used as an antireflection layered body.

A polarizer can be formed by providing the optical layered body in accordance with the present invention on the surfaces of a polarizing element opposite to the side on which the low refractive index layer is located in the above optical layered body. Such a polarizer also constitutes the present invention.

The polarizing element is not particularly limited, and for example, a polyvinyl alcohol film, a polyvinyl formal film, a polyvinyl acetal film or an ethylene-vinyl acetate copolymer saponified film, which are dyed with iodine or the like and stretched, can be used. In forming the optical layered body of the present invention and the polarizing element, the light-transmitting substrate (preferably a triacetyl cellulose film) is preferably subjected to a saponification treatment. The saponification treatment makes the adhesion good, and an antistatic effect can also be achieved.

The present invention also relates to an image display device including the above optical layered body or the above polarizer on the outermost surface. The above image display device may be a non-selfluminous image display device such as LCD or the like, or may be a selfluminous image display device such as PDP, FED, ELD (organic EL, inorganic EL), CRT or the like.

The LCD which is a typical example of the above non-selfluminous type includes a light-transmitting display and a light source apparatus to irradiate the light-transmitting display from the backside. When the image display device of the present invention is the LCD, the optical layered body of the present invention or the polarizer of the present invention is formed on the surface of this light-transmitting display.

When the present invention relates to a liquid crystal display device having the above optical layered body, a light source of the light source apparatus irradiates from the underside of the optical layered body. Here, in a liquid crystal display device of an STN mode, a retardation plate may be inserted between a liquid crystal display element and the polarizer. An adhesive layer may be provided between each of the layers of this liquid crystal display device as required.

The PDP which is the selfluminous image display device includes a surface glass substrate (an electrode is formed on the surface), and a backside glass substrate (an electrode and minute grooves are formed on the surface and phosphor layers of red, green and blue are formed in the grooves) which is located at a position opposite to the surface glass substrate with a discharge gas filled between these substrates. When the image display device of the present invention is the PDP, the PDP includes the optical layered body described above on the surface of the surface glass substrate or a front plate (glass substrate or film substrate) thereof.

The above selfluminous image display device may be an ELD apparatus in which luminous substances of zinc sulfide or diamines materials to emit light through the application of a voltage are deposited on a glass substrate by vapor deposition and display is performed by controlling a voltage to be applied to the substrate, or image display devices such as a CRT, which converts electric signals to light to generate visible images. In this case, the image display device includes the optical layered body described above on the outermost surface of each of the display devices or on the surface of a front plate thereof.

The image display device of the present invention can be used for displays such as televisions, computers, word processors and the like in any case. Particularly, it can be suitably used for the surfaces of displays for high-resolution images such as CRTs, liquid crystal panels, PDPs, ELDs and FEDs.

Effects of the Invention

In accordance with the present invention, an additive amount of the antistatic agent leading to high cost can be reduced.

In accordance with the present invention, since there is no need for forming the antistatic layer other than the low refractive index layer, it is possible to give no steps of producing the antistatic layer and forming the antistatic layer, and the optical layered body can be produced by a simpler step.

Further, since the layer having antistatic property is formed on the outermost layer of the optical layered body, the antistatic property can be achieved with efficiency.

BRIEF DESCRIPTION OF THE DRAWING

The FIG. 1 is a schematic drawing of an optical layered body according to the present invention.

BEST MODE FOR CARRYING OUT THE INVENTION

Figure 1:
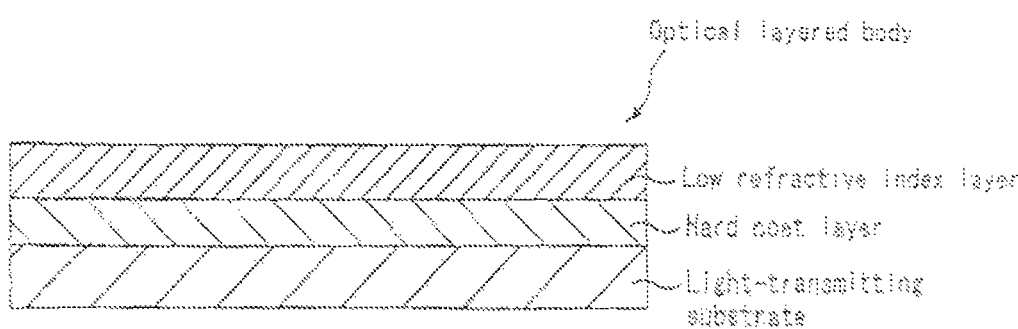
Figure 2:
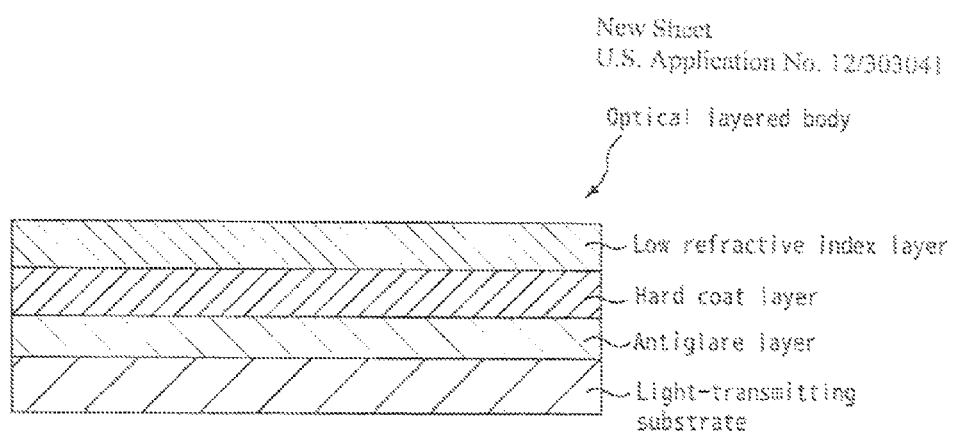
FIG. 2 is a schematic drawing of another optical layered body according to the present invention.
Figure 3:
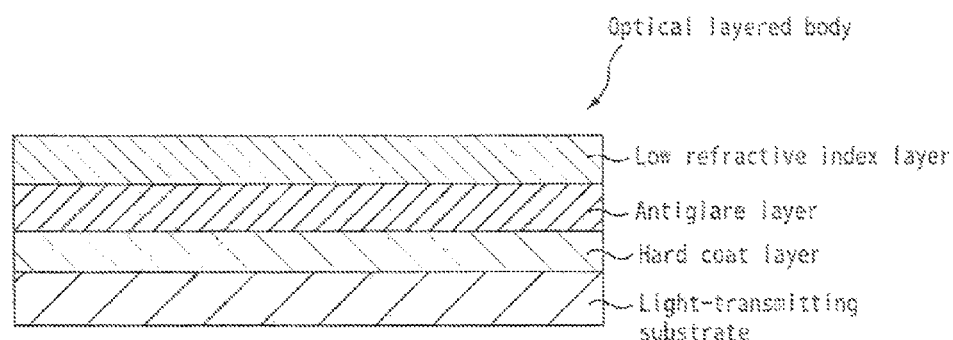
FIG. 3 is a schematic drawing of a still further optical layered body according to the present invention.
Figure 4:
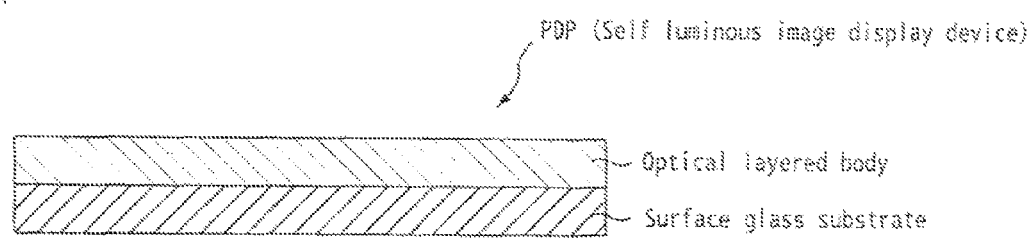
FIG. 4 is a schematic drawing of a PDP-Self luminous image display device according to the present invention.
Figure 5:
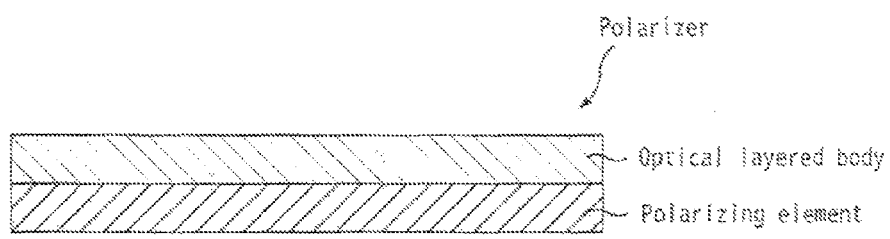
FIG. 5 is a schematic drawing of a polarizer according to the present invention.
Figure 6:
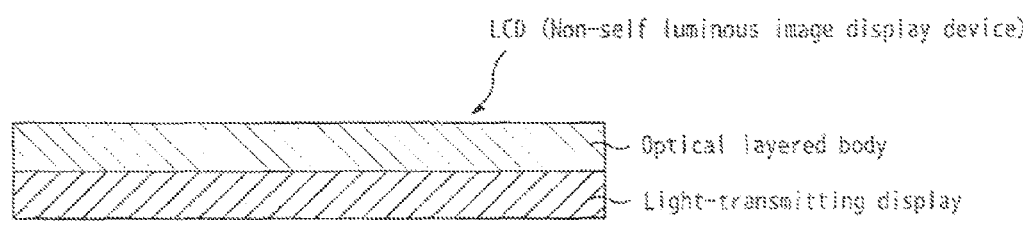
FIG. 6 is a schematic drawing of a LCD-Non-self luminous image display device according to the present invention.

Hereinafter, the characteristics of the present invention will be described in more detail by way of examples and comparative examples. However, the scope of the present invention is not limited to the examples.

Production Example 1

Compositions 1 to 6 described below were prepared as a composition for a hard coat layer.

| Composition 1 for a hard coat layer | |
|---|---|
| Urethane acrylate (UV-1700B; produced by Nippon Synthetic Chemical Industry Co., Ltd.) | 5 parts by weight |
| Polyester acrylate (M-9050; produced by TOAGOSEI Co., Ltd.) | 5 parts by weight |
| Polymerization initiator (Irgacure 184; produced by Ciba Specialty Chemicals K.K.) | 0.4 parts by weight |
| Methyl ethyl ketone | 10 parts by weight |

| Composition 2 for a hard coat layer | |
|---|---|
| Dipentaerithritol tetraacrylate (DPHA; produced by Nippon Kayaku Co., Ltd.) | 0.1 parts by weight |
| Antistatic agent (Uniresin UVASH-26, produced by Shin-Nakamura Chemical Co., Ltd., quaternary ammonium salt (containing a reaction group)) | 10 parts by weight |
| Polymerization initiator (Irgacure 184; produced by Ciba Specialty Chemicals K.K.) | 0.4 parts by weight |
| Methyl ethyl ketone | 10 parts by weight |

| Composition 3 for a hard coat layer | |
|---|---|
| Pentaerithritol triacrylate (PETA) | 0.1 parts by weight |
| Polythiophene (produced by Shin-Etsu Polymer Co., Ltd.) (on the solid content 100% equivalent basis) | 10 parts by weight |
| Polymerization initiator (Irgacure 184; produced by Ciba Specialty Chemicals K.K.) | 0.4 parts by weight |
| Methyl isobutyl ketone | 10 parts by weight |

| Composition 4 for a hard coat layer | |
|---|---|
| Pentaerithritol triacrylate (PETA) | 0.1 parts by weight |
| Antistatic agent (DMAA, produced by KOHJIN Co., Ltd.) | 10 parts by weight |
| Polymerization initiator (Irgacure 184; produced by Ciba Specialty Chemicals K.K.) | 0.4 parts by weight |
| Methyl isobutyl ketone | 10 parts by weight |

| Composition 5 for a hard coat layer | |
|---|---|
| Pentaerithritol triacrylate (PETA) | 0.1 parts by weight |
| Antistatic agent (Nikka taibo UVAS-201, produced by Nippon Kasei Chemical Co., Ltd.) | 10 parts by weight |
| Polymerization initiator (Irgacure 184; produced by Ciba Specialty Chemicals K.K.) | 0.4 parts by weight |
| Methyl isobutyl ketone | 10 parts by weight |

| Composition 6 for a hard coat layer | |
|---|---|
| Antistatic layer material C-4456 S-7 (ATO-containing electrically conductive ink, average particle diameter of ATO of 300 to 400 nm, solid content 45%, produced by Pelnox Ltd.) | 11.11 parts by weight |
| Dipentaerithritol hexaacrylate (DPHA) (produced by Nippon Kayaku Co., Ltd., refractive index 1.51) | 5 parts by weight |
| Polymerization initiator Irgacure 184 (produced by Ciba Specialty Chemicals K.K.) | 0.4 parts by weight |
| MIBK (methyl isobutyl ketone) | 9 parts by weight |
| Cyclohexanone | 1 part by weight |

Production Example 2

Compositions 1 to 11 and 1' described below were prepared as a composition for a low refractive index layer.

| Compositions 1 for a low refractive index layer | |
|---|---|
| Solution containing treated silica sol (silica sol solid content 20% by weight, "fine particle having voids, solution; methyl isobutyl ketone") | 14.3 parts by weight |
| Pentaerithritol triacrylate (PETA) | 1.65 parts by weight |
| Antistatic agent (DMAA, produced by KOHJIN Co.., Ltd., ammonium compound (containing a reaction group)) | 0.3 parts by weight |
| Polymerization initiator (Irgacure 369; produced by Ciba Specialty Chemicals K.K.) | 0.1 parts by weight |
| Modified silicone oil (X-22-164E; produced by Shin-Etsu Chemical Co., Ltd.) | 0.15 parts by weight |
| Methyl isobutyl ketone | 83.5 parts by weight |

| Compositions 2 for a low refractive index layer | |
|---|---|
| Solution containing treated silica sol (silica sol solid content 20% by weight, "fine particle having voids, solution; methyl isobutyl ketone") | 14.3 parts by weight |
| Pentaerithritol triacrylate (PETA) | 1.65 parts by weight |
| Antistatic agent (Phosmer M, produced by Uni-chemical Co., Ltd., phosphoric compound (containing a reaction group)) | 0.3 parts by weight |
| Polymerization initiator (Irgacure 369; produced by Ciba Specialty Chemicals K.K.) | 0.1 parts by weight |
| Modified silicone oil (X-22-164E; produced by Shin-Etsu Chemical Co., Ltd.) | 0.15 parts by weight |
| Methyl isobutyl ketone | 83.5 parts by weight |

| Compositions 3 for a low refractive index layer | |
|---|---|
| Solution containing treated silica sol (silica sol solid content 20% by weight, "fine particle having voids, solution; methyl isobutyl ketone") | 14.3 parts by weight |
| Pentaerithritol triacrylate (PETA) | 1.65 parts by weight |
| Antistatic agent (HIBORON ASA 501M5, produced by BORON INTERNATIONAL Co., Ltd., boron ionic conduction type) | 0.3 parts by weight (solid content) |
| Polymerization initiator (Irgacure 369; produced by Ciba Specialty Chemicals K.K.) | 0.1 parts by weight |
| Modified silicone oil (X-22-164E; produced by Shin-Etsu Chemical Co., Ltd.) | 0.15 parts by weight |
| Methyl isobutyl ketone | 83.5 parts by weight |

| Compositions 4 for a low refractive index layer | |
|---|---|
| Solution containing treated silica sol (silica sol solid content 20% by weight, "fine particle having voids, solution; methyl isobutyl ketone") | 14.3 parts by weight |
| Pentaerithritol triacrylate (PETA) | 1.65 parts by weight |
| Antistatic agent (Uniresin UVASH-26, produced by Shin-Nakamura Chemical Co., Ltd., quaternary ammonium type (containing a reaction group)) | 0.3 parts by weight |
| Polymerization initiator (Irgacure 369; produced by Ciba Specialty Chemicals K.K.) | 0.1 parts by weight |
| Modified silicone oil (X-22-164E; produced by Shin-Etsu Chemical Co., Ltd.) | 0.15 parts by weight |
| Methyl isobutyl ketone | 83.5 parts by weight |

| Compositions 5 for a low refractive index layer | |
|---|---|
| Solution containing treated silica sol (silica sol solid content 20% by weight, "fine particle having voids, solution; methyl isobutyl ketone") | 14.3 parts by weight |
| Pentaerithritol triacrylate (PETA) | 1.65 parts by weight |
| Antistatic agent (HOMOGENOL L-18, produced by KAO CORPORATION, nonionic surfactant (not including a reaction group)) | 0.3 parts by weight (solid content) |
| Polymerization initiator (Irgacure 369; produced by Ciba Specialty Chemicals K.K.) | 0.1 parts by weight |
| Modified silicone oil (X-22-164E; produced by Shin-Etsu Chemical Co., Ltd.) | 0.15 parts by weight |
| Methyl isobutyl ketone | 83.5 parts by weight |

| Composition 6 for a low refractive index layer | |
|---|---|
| Solution containing treated silica sol (silica sol solid content 20% by weight, "fine particle having voids, solution; methyl isobutyl ketone") | 14.3 parts by weight |
| Polymerization initiator (Irgacure 369; produced by Ciba Specialty Chemicals K.K.) | 0.1 parts by weight |
| Modified silicone oil (X-22-164E; produced by Shin-Etsu Chemical Co., Ltd.) | 0.15 parts by weight |
| Antistatic material C-4456 S-7 (ATO-containing electrically conductive ink, average particle diameter of ATO of 300 to 400 nm, solid content 45%, produced by Pelnox Ltd.) | 0.66 parts by weight |
| Methyl isobutyl ketone | 80.5 parts by weight |
| Cyclohexanone | 2.5 parts by weight |

| Compositions 7 for a low refractive index layer | |
|---|---|
| Solution containing treated silica sol (silica sol solid content 20% by weight, "fine particle having voids, solution; methyl ethyl ketone") | 14.3 parts by weight |
| Pentaerithritol triacrylate | 1.65 parts by weight |
| Polymerization initiator (Irgacure 369; produced by Ciba Specialty Chemicals K.K.) | 0.1 parts by weight |
| Modified silicone oil (X-22-164E; produced by Shin-Etsu Chemical Co., Ltd.) | 0.15 parts by weight |
| Antistatic material (Sankonol TBX; produced by Sanko Chemical Industry Co., Ltd., lithium ionic conduction type) | 0.3 parts by weight |
| Methyl isobutyl ketone | 83.5 parts by weight |

| Compositions 8 for a low refractive index layer | |
|---|---|
| Solution containing treated silica sol (silica sol solid content 20% by weight, "fine particle having voids, solution; methyl ethyl ketone") | 14.3 parts by weight |
| Pentaerithritol triacrylate | 1.65 parts by weight |
| Polymerization initiator (Irgacure 369; produced by Ciba Specialty Chemicals K.K.) | 0.1 parts by weight |
| Modified silicone oil (X-22-164E; produced by Shin-Etsu Chemical Co., Ltd.) | 0.15 parts by weight |
| Antistatic material (carbon nanotube dispersion; produced by SIGMA-ALDRICH Japan K.K., diameter of 2 to 8 nm, length of 500 to 1000 nm) | 0.8 parts by weight |
| Methyl isobutyl ketone | 83.5 parts by weight |
| Compositions 9 for a low refractive index layer | |
| Solution containing treated silica sol (silica sol solid content 20% by weight, "fine particle having voids, solution; methyl isobutyl ketone") | 14.3 parts by weight |
| Pentaerithritol triacrylate (PETA) | 1.65 parts by weight |
| Antistatic agent (A400-50R, produced by Sanko Chemical Industry Co., Ltd., lithium ionic type) | 0.3 parts by weight |
| Polymerization initiator (Irgacure 127; produced by Ciba Specialty Chemicals K.K.) | 0.1 parts by weight |
| Modified silicone oil (X22-4272; produced by Shin-Etsu Chemical Co., Ltd.) | 0.15 parts by weight |
| Methyl isobutyl ketone | 83.5 parts by weight |
| Compositions 10 for a low refractive index layer | |
| Solution containing treated silica sol (silica sol solid content 20% by weight, "fine particle having voids, solution; methyl isobutyl ketone") | 14.3 parts by weight |
| Pentaerithritol triacrylate (PETA) | 1.65 parts by weight |
| Pyridinium antistatic agent (CIL 513, produced by Japan Carlit Co., Ltd.) | 0.3 parts by weight |
| Polymerization initiator (Irgacure 127; produced by Ciba Specialty Chemicals K.K.) | 0.1 parts by weight |
| Modified silicone oil (X-22-4272; produced by Shin-Etsu Chemical Co., Ltd.) | 0.15 parts by weight |
| Methyl isobutyl ketone | 83.5 parts by weight |
| Compositions 11 for a low refractive index layer | |
| Solution containing treated silica sol (silica sol solid content 20% by weight, "fine particle having voids solution; methyl isobutyl ketone") | 14.3 parts by weight |
| Pentaerithritol triacrylate (PETA) | 1.65 parts by weight |
| Imidazolium antistatic agent | 0.3 parts by weight |
| Polymerization initiator (Irgacure 127; produced by Ciba Specialty Chemicals K.K.) | 0.1 parts by weight |
| Modified silicone oil (X-22-164E; produced by Shin-Etsu Chemical Co., Ltd.) | 0.15 parts by weight |
| Methyl isobutyl ketone | 83.5 parts by weight |
| Compositions 1' for a low refractive index layer | |
| Solution containing treated silica sol (silica sol solid content 20% by weight, "fine particle having voids, solution; methyl isobutyl ketone") | 14.3 parts by weight |
| Pentaerithritol triacrylate (PETA) | 1.95 parts by weight |
| Polymerization initiator (Irgacure 369; produced by Ciba Specialty Chemicals K.K.) | 0.1 parts by weight |
| Modified silicone oil (X-22-164E; produced by Shin-Etsu Chemical Co., Ltd.) | 0.15 parts by weight |
| Methyl isobutyl ketone | 83.5 parts by weight |

Production Example 3

Compositions 1 to 2 described below were prepared as a composition for an antistatic layer.

| Composition 1 for an antistatic layer | |
|---|---|
| Dipentaerithritol tetraacrylate (DPHA; produced by Nippon Kayaku Co., Ltd.) | 0.1 parts by weight |
| Antistatic agent (Uniresin UVASH-26, produced by | 10 parts by weight |

| | |
|---|---|
| Shin-Nakamura Chemical Co., Ltd., quaternary ammonium salt (containing a reaction group)) | |
| Polymerization initiator (Irgacure 184; produced by Ciba Specialty Chemicals K.K.) | 0.4 parts by weight |
| Methyl isobutyl ketone | 90 parts by weight |
| Composition 2 for an antistatic layer | |
| Pentaerithritol triacrylate (PETA) | 0.1 parts by weight |
| Antistatic material C-4456 S-7 (ATO-containing electrically conductive ink, average particle diameter of ATO of 300 to 400 nm, solid content 45%, produced by Pelnox Ltd.) | 22.22 parts by weight |
| Methyl isobutyl ketone | 4 parts by weight |
| Cyclohexanone | 4 parts by weight |

Example 1

A triacetyl cellulose (TAC) film (produced by FUJIFILM CORPORATION, TF 80UL, thickness of 80 μm) was prepared, the composition 1 for a hard coat layer was applied (bar coating) onto the surface of the film in a wet weight of 20 g/m$^2$ (dry weight of 10 g/m$^2$), and the applied composition on the film was dried at 50° C. to eliminate a solvent. Thereafter, the dried composition was cured by irradiating ultraviolet light onto the composition at an exposure dose of 50 mJ/cm$^2$ with an ultraviolet irradiation apparatus (manufactured by Fusion UV Systems Japan K. K.) to form a hard coat layer of 10 μm.

Next, the composition 1 for a low refractive index layer was applied (bar coating) onto the surface of the hard coat layer in dry weight of 0.1 g/m$^2$, and then the applied composition was dried at 40° C. to eliminate a solvent. Thereafter, ultraviolet light was irradiated to the composition at an exposure dose of 200 mJ/cm$^2$ with the ultraviolet irradiation apparatus (manufactured by Fusion UV Systems Japan K.K.) to produce an optical layered body. The low refractive index layer was formed so as to have such a film thickness that a reflectance becomes a local minimal value in the vicinity of a wavelength of 550 nm (a film thickness of 0.10 μm).

Example 2

An optical layered body was produced by the same procedure as in Example 1 except for using the composition 2 for a low refractive index layer in place of the composition 1 for a low refractive index layer.

Example 3

An optical layered body was produced by the same procedure as in Example 1 except for using the composition 3 for a low refractive index layer in place of the composition 1 for a low refractive index layer.

Example 4

An optical layered body was produced by the same procedure as in Example 1 for using the composition 4 for a low refractive index layer in place of the composition 1 for a low refractive index layer.

Example 5

An optical layered body was produced by the same procedure as in Example 1 except for using the composition 5 for a low refractive index layer in place of the composition 1 for a low refractive index layer.

Example 6

An optical layered body was produced by the same procedure as in Example 1 except for using the composition 6 for a low refractive index layer in place of the composition 1 for a low refractive index layer.

Example 7

An optical layered body was produced by the same procedure as in Example 1 except for using the composition 7 for a low refractive index layer in place of the composition 1 for a low refractive index layer.

Example 8

An optical layered body was produced by the same procedure as in Example 1 except for using the composition 8 for a low refractive index layer in place of the composition 1 for a low refractive index layer.

Example 9

An optical layered body was produced by the same procedure as in Example 1 except for using the composition 9 for a low refractive index layer in place of the composition 1 for a low refractive index layer.

Example 10

An optical layered body was produced by the same procedure as in Example 1 except for using the composition 10 for a low refractive index layer in place of the composition 1 for a low refractive index layer.

Example 11

An optical layered body was produced by the same procedure as in Example 1 except for using the composition 11 for a low refractive index layer in place of the composition 1 for a low refractive index layer.

Comparative Example 1

An optical layered body was produced by the same procedure as in Example 1 except for using the composition 2 for a hard coat layer in place of the composition 1 for a hard coat layer and the composition 1' for a low refractive index layer in place of the composition 1 for a low refractive index layer.

Comparative Example 2

An optical layered body was produced by the same procedure as in Example 1 except for using the composition 1' for a low refractive index layer in place of the composition 1 for a low refractive index layer.

Comparative Example 3

An optical layered body was produced by the same procedure as in Comparative Example 1 except for using the composition 3 for a hard coat layer in place of the composition 2 for a hard coat layer.

Comparative Example 4

An optical layered body was produced by the same procedure as in Comparative Example 1 except for using the composition 4 for a hard coat layer in place of the composition 2 for a hard coat layer.

Comparative Example 5

An optical layered body was produced by the same procedure as in Comparative Example 1 except for using the composition 5 for a hard coat layer in place of the composition 2 for a hard coat layer.

Comparative Example 6

Using a triacetyl cellulose film (TF 80UL, thickness of 80 μm, produced by FUJIFILM CORPORATION) having a thickness of 80 μm as a transparent substrate, the composition 1 for an antistatic layer was applied onto the film with a wire wound rod for coating (a Mayer bar), and the applied composition was heated to dry for 1 minute in an oven of 50° C. to evaporate the solvent fraction, and then a coat was cured in a state of being half-cured by irradiating ultraviolet light onto the coat in such a way that an exposure dose was 30 mJ under nitrogen purge (oxygen content below 200 ppm) to form an antistatic layer having a film thickness of 1 μm.

Next, an optical layered body was produced on this antistatic layer by the same procedure as in Example 1 using the composition 1 for a hard coat layer and the composition 1' for a low refractive index layer.

Comparative Example 7

An optical layered body was produced by the same procedure as in Comparative Example 1 except for using the composition 6 for a hard coat layer in place of the composition 2 for a hard coat layer.

In the optical layered body of Comparative Example 7, the fine particles had to be added so much that a ratio of the antistatic agent to the binder matrix could be 1/1 for achieving antistatic performance equivalent to Examples. The reason for this is that if some portions of the fine particles are not contact with one another, antistatic performance is not exhibited. This optical layered body could attain antistatic performance, but its haze was high to be used as a display and it could not be used because of its opacity.

Comparative Example 8

An optical layered body was produced by the same procedure as in Comparative Example 6 except for using the composition 2 for an antistatic layer.

Here, each of the comparative examples shows mixing example required for achieving antistatic performance equivalent to Examples. From Table 1 shown below, it is found that an amount of the antistatic agent to be added can be significantly reduced by imparting antistatic performance to the low refractive index layer.

Evaluation 1 Adhesion of Dust

The TAC surface on the side, on which the low refractive index layer is not formed, of the optical layered body prepared in examples and comparative examples was rubbed back and forth 20 times with a polyester cloth, and cigarette ash is moved closer to the rubbed surface to evaluate the adhesion of dust according to the following criteria. The results of evaluations are shown in Table 1.

Evaluation Criteria good: There is no adhesion of dust and there is an effect of preventing the adhesion of dust.

poor: There is much adhesion of dust and there is not an effect of preventing the adhesion of dust.

Evaluation 2 Surface Resistivity

Surface resistivity (Ω/square) was measured at an applied voltage of 1000V with a surface resistivity meter (manufactured by Mitsubishi Chemical Corporation, trade no.; Hiresta IP MCP-HT260).

Evaluation 3 Haze Value

Haze value was measured according to JIS K 71.36. Here, a reflection/transmittance meter HM-150 (manufactured by Murakami Color Research Laboratory Co., Ltd.) was used as a measuring equipment.

Evaluation 4 Weight Ratio of the Antistatic Agent to the Binder Matrix

A mixing ratio of the weight of the added antistatic agent to the weight of the resin (determined by subtracting the weights of the antistatic agent and the solvent from the weight of the layer containing the antistatic agent) contained in the layer containing the antistatic agent was measured assuming the weight of the resin to be 1.

According to the above description, a comparison of the additive amount of the antistatic agent between examples and comparative examples becomes possible. Particularly when the same materials are used as antistatic agents of an organic agent or an inorganic agent, respectively, the amounts of the antistatic agent to be added can be compared with one another.

TABLE 1

|  | Layer containing an antistatic agent | Antistatic material | Evaluation 1 | Evaluation 2 | Evaluation 3 | Evaluation 4 |
| --- | --- | --- | --- | --- | --- | --- |
| Example 1 | low refractive index layer | DMAA | good | $10^{12}$ | 0.3 | 0.06 |
| Example 2 | low refractive index layer | Phosmer M | good | $10^{12}$ | 0.3 | 0.06 |
| Example 3 | low refractive index layer | ASA501M5 | good | $10^{12}$ | 0.3 | 0.06 |

TABLE 1-continued

| | Layer containing an antistatic agent | Antistatic material | Evaluation 1 | Evaluation 2 | Evaluation 3 | Evaluation 4 |
|---|---|---|---|---|---|---|
| Example 4 | low refractive index layer | UVASH26 | good | $10^{12}$ | 0.3 | 0.06 |
| Example 5 | low refractive index layer | HOMOGENOL L-18 | good | $10^{12}$ | 0.3 | 0.06 |
| Example 6 | low refractive index layer | ATO ultrafine particle | good | $10^{12}$ | 0.3 | 0.10 |
| Example 7 | low refractive index layer | Sankonol TBX | good | $10^{12}$ | 0.3 | 0.06 |
| Example 8 | low refractive index layer | carbon nanotube | good | $10^{12}$ | 0.3 | 0.06 |
| Example 9 | low refractive index layer | A400-50R | good | $10^{12}$ | 0.3 | 0.06 |
| Example 10 | low refractive index layer | CIL513 | good | $10^{12}$ | 0.3 | 0.06 |
| Example 11 | low refractive index layer | imidazolium antistatic agent | good | $10^{12}$ | 0.3 | 0.06 |
| Comparative Example 1 | hard coat layer | UVASH26 | good | $10^{12}$ | 0.3 | 100 |
| Comparative Example 2 | none | none | poor | $10^{13}$ or more | 0.3 | 0 |
| Comparative Example 3 | hard coat layer | polythiophene | good | $10^{12}$ | 5.0 or more | 100 |
| Comparative Example 4 | hard coat layer | DMMA | good | $10^{12}$ | 0.3 | 100 |
| Comparative Example 5 | hard coat layer | UVAS201 | good | $10^{12}$ | 0.3 | 100 |
| Comparative Example 6 | single layer containing an antistatic agent | UVASH26 | good | $10^{13}$ or more | 0.3 | 100 |
| Comparative Example 7 | hard coat layer | ATO ultrafine particle | good | $10^{12}$ | 10 or more | 1 |
| Comparative Example 8 | single layer containing an antistatic agent | ATO ultrafine particle | good | $10^{12}$ | 1.0 or more | 100 |

INDUSTRIAL APPLICABILITY

In accordance with the present invention, it is possible to form an optical layered body in which an additive amount of an antistatic agent causing high cost can be reduced, and a high antistatic property can be imparted simply and at a low cost. The resulting optical layered body can be suitably used preferably as an antireflection layered body. Therefore, the optical layered body of the present invention can be suitably applied to cathode ray tube (CRT) display devices, liquid crystal displays (LCD), plasma displays (PDP), electroluminescence displays (ELD), and the like.

The invention claimed is:

1. An optical layered body comprising a light-transmitting substrate and a low refractive index layer, formed on the light-transmitting substrate,
wherein 1) the low refractive index layer is formed on the outermost surface, and
2) the low refractive index layer contains an antistatic agent in an amount in the low refractive index layer of 0.5 to 30% by weight, wherein said antistatic agent contains a reaction group in the molecule,
wherein the low refractive index layer is formed from a composition that contains silica particles having voids, pentaerythritol triacrylate, a polymerization initiator, the antistatic agent and at least one member selected from the group consisting of a thermoplastic resin, a thermosetting resin, an ionizing radiation-curable resin and an ionizing radiation-curable compound.

2. The optical layered body according to claim 1, wherein a content of the antistatic agent in the low refractive index layer is 1 to 20% by weight.

3. The optical layered body according to claim 2, wherein the antistatic agent is substantially clear and colorless.

4. The optical layered body according to claim 2, which comprises an antiglare layer 1) between a hard coat layer and the light-transmitting substrate, or 2) between the hard coat layer and the low refractive index layer.

5. The optical layered body according to claim 2, which is used as an antireflection layered body.

6. A self luminous image display device comprising the optical layered body according to claim 2, on the outermost surface.

7. A polarizer comprising a polarizing element, wherein the polarizer includes the optical layered body according to claim 2, on a surface of the polarizing element.

8. The optical layered body according to claim 1, wherein the antistatic agent is substantially clear and colorless.

9. The optical layered body according to claim 8, which comprises an antiglare layer 1) between a hard coat layer and the light-transmitting substrate, or 2) between the hard coat layer and the low refractive index layer.

10. The optical layered body according to claim 8, which is used as an antireflection layered body.

11. A self luminous image display device comprising the optical layered body according to claim 8, on the outermost surface.

12. A polarizer comprising a polarizing element, wherein the polarizer includes the optical layered body according to claim 8, on a surface of the polarizing element.

13. The optical layered body according to claim 1, which comprises an antiglare layer 1) between a hard coat layer and the light-transmitting substrate, or 2) between the hard coat layer and the low refractive index layer.

14. The optical layered body according to claim 13, which is used as an antireflection layered body.

15. A self luminous image display device comprising the optical layered body according to claim 13, on the outermost surface.

16. The optical layered body according to claim 1, which is used as an antireflection layered body.

17. A self luminous image display device comprising the optical layered body according to claim 16, on the outermost surface.

18. A self luminous image display device comprising the optical layered body according to claim 1 on the outermost surface.

19. A polarizer comprising a polarizing element, wherein the polarizer includes the optical layered body according to claim 1 on a surface of the polarizing element.

20. A non-self luminous image display device comprising the optical layered body according to claim 1.

* * * * *